US006947754B2

(12) United States Patent
Ogasawara

(10) Patent No.: US 6,947,754 B2
(45) Date of Patent: Sep. 20, 2005

(54) LOCATION REGISTRATION METHOD, INFORMATION DISTRIBUTION METHOD, MOBILE COMMUNICATIONS NETWORK AND MOBILE COMMUNICATIONS TERMINAL

(75) Inventor: Koichi Ogasawara, Chigasaki (JP)

(73) Assignee: NTT DoCoMo, Inc., Tokyo (JP)

( * ) Notice: Subject to any disclaimer, the term of this patent is extended or adjusted under 35 U.S.C. 154(b) by 373 days.

(21) Appl. No.: 10/111,733

(22) PCT Filed: Sep. 5, 2001

(86) PCT No.: PCT/JP01/07685

§ 371 (c)(1),
(2), (4) Date: Apr. 26, 2002

(87) PCT Pub. No.: WO02/21862

PCT Pub. Date: Mar. 14, 2002

(65) Prior Publication Data

US 2002/0177451 A1 Nov. 28, 2002

(30) Foreign Application Priority Data

Sep. 6, 2000 (JP) ........................................ 2000-270714

(51) Int. Cl.[7] .......................... H04Q 7/20; H04M 11/04
(52) U.S. Cl. ................. 455/456.3; 455/456.1; 455/404.2; 455/414.3; 455/414.1; 455/456.2
(58) Field of Search ..................... 455/456.3, 456.1, 455/456.2, 432.1, 404.2, 422.1, 556.2, 566, 414.1, 414.3

(56) References Cited

U.S. PATENT DOCUMENTS 5,548,586 A * 8/1996 Kito et al. ................... 370/349
5,796,351 A   8/1998 Yabuki (Continued)

FOREIGN PATENT DOCUMENTS

| CA | 2241273    | 5/1998  |
|----|------------|---------|
| EP | 0848564    | 6/1998  |
| JP | 8-289117   | 11/1996 |
| JP | 11-69422   | 3/1999  |
| JP | 11-187469  | 7/1999  |
| JP | 11-285054  | 10/1999 |
| JP | 2000-115857| 4/2000  |

OTHER PUBLICATIONS

TSG Services and System Aspects: "Technical Specification Group Services and Systems Aspects; Architectural Requirements for Release 1999" 3G TS 23.121 V3.0.0, Jul. 31, 1999.

ETSI GSM UMTS: "Digital cellular communications system (Phase 2+) (GSM); Universal Mobile Telecommunications System (UMYS);Support of localized Service Area (SoLSA) Stage 2" ESTI TS 123.073 V3.0.0, Jan. 2000.

(Continued)

*Primary Examiner*—Sonny Trinh
*Assistant Examiner*—Huy Phan
(74) *Attorney, Agent, or Firm*—Brinks Hofer Gilson & Lione

(57) ABSTRACT

An ID signal indicating a base station ID is broadcasted by a base station 21 sited in a specific area of a location registration area. When receiving the ID signal, a mobile station 10 located in the radio zone of the base station 21 transmits to the base station 21 a location registration request signal including the base station ID and a mobile station ID. The base station ID and the mobile station ID are registered in a home memory 23 as narrow-area location registration information. An IP server 40a acquires location related information from a location-related information data base 41a and transmits it to a gateway server 25. The gateway server 25 specifies a destination of transmission for the received location related information by referring to the home memory 23 and transmits the location related information to the mobile station 10.

40 Claims, 11 Drawing Sheets

U.S. PATENT DOCUMENTS

| | | | |
|---|---|---|---|
| 5,889,770 A | | 3/1999 | Jokiaho et al. |
| 5,930,699 A | * | 7/1999 | Bhatia ...................... 455/456.3 |
| 6,108,533 A | * | 8/2000 | Brohoff .................... 455/414.3 |
| 6,148,198 A | * | 11/2000 | Anderson et al. ........ 455/432.1 |
| 6,256,498 B1 | * | 7/2001 | Ludwig ....................... 455/433 |
| 6,259,405 B1 | * | 7/2001 | Stewart et al. .............. 342/457 |
| 6,434,381 B1 | * | 8/2002 | Moore et al. ............ 455/414.3 |
| 6,629,136 B1 | * | 9/2003 | Naidoo ........................ 709/219 |
| 6,650,902 B1 | * | 11/2003 | Richton ................... 455/456.3 |
| 6,813,502 B2 | * | 11/2004 | Son et al. ................. 455/456.3 |
| 2001/0044310 A1 | * | 11/2001 | Lincke ........................ 455/456 |
| 2002/0164995 A1 | * | 11/2002 | Brown et al. ................ 455/456 |
| 2004/0110515 A1 | * | 6/2004 | Blumberg et al. ........ 455/456.1 |

OTHER PUBLICATIONS

"Digital cellular telecommunications system (Phase 2+); Location Services (LCS); Broadcast Network Assistance for Enhanced Observed Time Differences (E–OTD) and Global Positioning System (GPS) Positioning Methods" ETSI TS 101.528 V8.1.0, Jun., 2000.

TSG Services and Systems Aspects; Location Services (LCS); :22.071 v 3.2.0 Location Services (LCS) Service Description, stage 1 ESTI TS 22.071 V3.2.0, Dec. 1999.

TSG Services and System Aspects: TS 23.171 v 1.0.0 "Functional stage 2 description of location services in UMTS" ESTI TS 23.171 V1.0.0, Oct., 1999.

TSG RAN—Working Group 2: TR 25.923 v1.1.0 Report on Location Services (LCS) .ETSI 25.923 V1.1.0, Aug. 1999.

* cited by examiner

| WIDE-AREA LOCATION REGISTRATION AREA ID | MOBILE STATION ID |
|---|---|
| AREA0001 | MS09044444444 |
|  | MS09055555555 |
|  |  |
|  |  |
| AREA0002 | MS09066666666 |
| ……… | ……… |
| ……… | ……… |
| ……… | ……… |
| ……… | ……… |

| BASE STATION ID | MOBILE STATION ID |
|---|---|
| BS0006 | MS09011111111 |
|  | MS09022222222 |
|  | – |
| BS0007 | – |
|  | – |
|  | – |
| ········ | ········ |
| ········ | ········ |
| ········ | ········ |
| ········ | ········ |
| ········ | ········ |

| BASE STATION ID | AREA CODE |
|---|---|
| BS0006 | CODE001 |
| BS0007 | CODE002 |
| ......... | ......... |
| ......... | ......... |
| ......... | ......... |
| ......... | ......... |

FIG. 8

| AREA CODE | AREA NAME | LOCATION RELATED INFORMATION | | | | |
|---|---|---|---|---|---|---|
| | | | BUILDING NAME | ADDRESS | TELEPHONE NO | ......... |
| CODE001 | 1-CHOME, YAESU CHUO-KU (IN FRONT OF TOKYO STATION) | RESTAURANT A | ......... | ......... | ......... | ......... |
| | | ......... | ......... | ......... | ......... | ......... |
| | | MOVIE THEATER B | ......... | ......... | ......... | ......... |
| | | BANK C | ......... | ......... | ......... | ......... |
| | | ......... | ......... | ......... | ......... | ......... |
| | | EVENT D | ......... | ......... | ......... | ......... |
| | | ......... | ......... | ......... | ......... | ......... |
| CODE002 | ......... | ......... | ......... | ......... | ......... | ......... |
| | | ......... | ......... | ......... | ......... | ......... |
| | | ......... | ......... | ......... | ......... | ......... |

| BASE STATION ID | AREA CODE |
|---|---|
| BS0001 | CODE012 |
| BS0002~BS0005 | CODE030 |
| BS0006 | CODE001 |
| ......... | ......... |
| ......... | ......... |
| ......... | ......... |

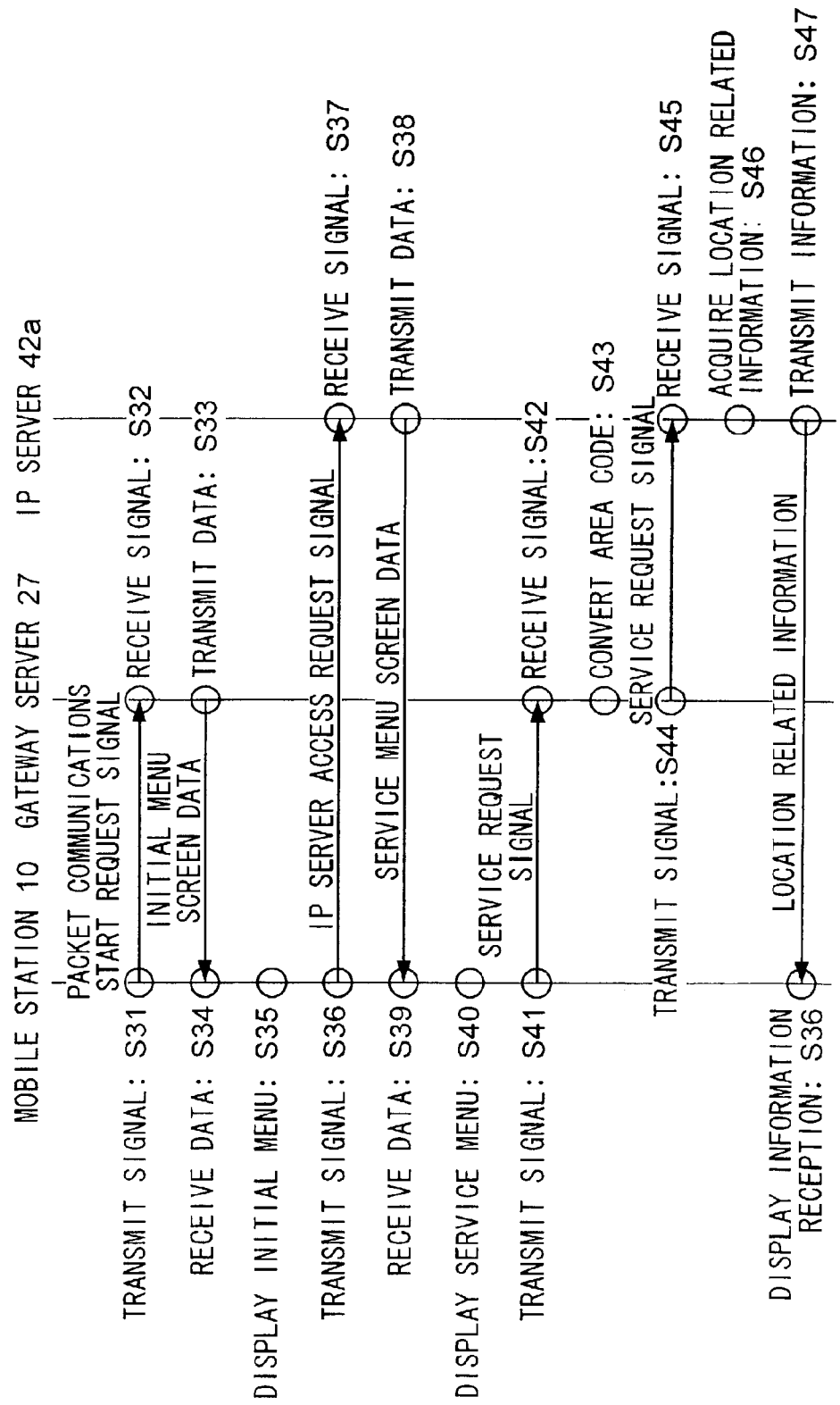

LOCATION REGISTRATION METHOD, INFORMATION DISTRIBUTION METHOD, MOBILE COMMUNICATIONS NETWORK AND MOBILE COMMUNICATIONS TERMINAL

TECHNICAL FIELD

The present invention relates to mobile communications, and more specifically to location registration of a mobile communication terminal and information distribution to the mobile communication terminal in a mobile communication network.

BACKGROUND ART

Recently, wireless type mobile communication networks serving mobile communication terminals such as wireless telephones have become more prevalent. This type of mobile communication network typically determines the current location of a wireless telephone. Determination of the current location allows the mobile communication network to call the wireless telephone when calls to the wireless telephone are received by the mobile communication network.

The location of the wireless telephone may be determined with a location registration process. In the location registration process, a location of a wireless telephone is registered as being within a location registration area. The location registration area includes multiple radio zones and is a geographic area having a radius of several hundred meters to several kilometers. The geographic area is formed by the radio zones of multiple base stations of a mobile communications network. Each base station transmits an area ID specific to the location registration area. Moving wireless telephones may detect entry into a different location registration area when an area ID received from a base station changes.

When the location registration area changes, a wireless telephone sends a location-registration request signal to the mobile communications network. As a result of the location-registration request signal, the ID of the wireless telephone and the area ID of the new location registration area are registered. The ID of the wireless telephone and the area ID of the new location registration area are registered as location registration information in a location registration database in the mobile communications network. In this way, the mobile communication network can know the location registration area in which a wireless telephone is currently located. The mobile communication network may use the location registration information to forward calls to the wireless telephone.

Recently, voiceless use of a mobile communications network such as a mobile packet communications service is becoming popular. Data communication services that distribute value added information relating to the location of a wireless telephone using the location registration information have been proposed. Using the aforementioned conventional location registration process, however, the actual location of a wireless telephone cannot be provided. The actual location cannot be determined based on the location registration information since the location registration area is a wide area that has multiple radio zones (an area with a radius of, for example, 10 Km or greater). For example, in conventional services, it is not possible to distribute location related information limited to a narrow area around a specific train station or the like.

Accordingly, a need exists for a location registration system that distributes location related information indicating a more limited area that the wireless telephone is residing within.

SUMMARY

To solve the aforementioned problems, the present invention provides a location registration method for registering a location of a mobile communications terminal served by a mobile communications network. The method comprises: broadcasting, from each of one or multiple specific base stations a radio-zone information notification signal indicating each of the base station's own radio zone.

Each of the one or the multiple specific base stations constitutes a radio zone. Each of the one or the multiple specific base stations may be part of a location registration area consisting of a plurality of radio zones. Each of the radio zones is provided from a radio transmission device sited in each of the specific base stations. The method also includes detecting in the mobile communications terminal the location of the mobile terminal in a radio zone of the one or the multiple specific base stations after having received the radio-zone information notification signal. The method further comprises transmitting a request signal from the mobile communications terminal that has detected its location in the radio zone of the one base station.

The request signal is for requesting a location registration process from the one base station. Receiving in the one base station the request signal and performing, in the mobile communications network, a location registration process. The location registration process may generate information regarding a present location of the mobile communications terminal in the radio zone of the one base station based on the request signal received by the base station.

The present invention further provides an information distribution method for distributing information through a mobile communications network to a mobile communications terminal served by the mobile communications network. The method includes broadcasting, from each of one or multiple specific base stations a radio-zone information notification signal indicating each of the base station's own radio zone. Each of the one or the multiple specific base stations constitutes a radio zone. Each of the one or the multiple specific base stations may be part of a location registration area consisting of a plurality of radio zones. Each of the radio zones is provided from a radio transmission device sited in each of the base stations. The method also includes detecting, with the mobile communications terminal, the location of the mobile communication terminal in a radio zone of the one or one of the multiple specific base stations following receipt of the radio-zone information notification signal.

Transmitting, from the mobile communications terminal to one specific base station, a request signal to request a location registration process is also included in the method. The method further includes receiving in the one specific base station the request signal and performing a location registration process in the mobile communications network. The location registration process includes generating information on a present location of the mobile communications terminal. In addition, the location registration process includes distributing information from an information distribution server to the mobile communications terminal. The information may be distributed after designating the mobile communications terminal based on the present location information generated by the location registration process.

The present invention further provides an information distribution method for distributing information through a mobile communications network to a mobile communications terminal served by the mobile communications network. The method includes transmitting from a mobile communications terminal a call signal for calling another communications terminal and receiving the transmitted call signal with the one or one of the multiple specific base stations. Each of the one or-multiple specific base stations constitutes a radio zone. Each of the one or multiple specific base stations may be part of a location registration area consisting of a plurality of radio zones.

The method also includes performing, a location registration process in the mobile communications network. The location registration process includes generating information on a present location of the mobile communications terminal in the radio zone of one base station. The information may be generated based on the call signal received by the one base station. In addition, the location registration process includes distributing information from an information distribution server, to the mobile communications terminal located in the radio zone of the one base station. The information may be distributed after designation of the mobile communications terminal based on the present location information generated by the location registration.

The present invention provides still another information distribution method for distributing information from an information distribution server to a mobile communications terminal served by a mobile communications network. The method comprises: transmitting from the mobile communications terminal a request signal for information distribution. The request signal for information distribution includes a request for the identification information of the mobile terminal making the request. The method also includes receiving the request signal with a base station. The base station constituting a radio zone in which the mobile communications terminal is located.

Transferring the request signal from the base station that has received the request signal to a determined information distribution server is also included in the method. The request signal is transferred after identification information of the base station has been affixed by the base station to the request signal The method further includes distributing information from the information distribution server to the mobile communication terminal after specifying a location of the mobile communications terminal. The information distribution server may distribute the requested information distribution based on the identification information of the base station affixed to the request signal and the identification information of the mobile communications terminal included in the request signal.

Furthermore, the present invention provides a mobile communications network and a mobile communications terminal that includes means for executing the location registration methods and information distribution methods mentioned above.

For example, the present invention provides a mobile communications network for performing a location registration process to generate present location information of a mobile communications terminal. The mobile communications network comprises: signal broadcasting means for broadcasting, from each of one or multiple specific base stations a radio-zone information notification signal. Each of the one or multiple specific base stations constitutes a radio zone. Each of the one or multiple specific base stations may be part of a location registration area consisting of a plurality of radio zones. The radio-zone information notification signal indicates the radio zone of the one or one of the multiple specific base stations.

The radio-zone information notification signal is broadcast by each of the one or multiple specific base stations. A signal reception means for receiving a request signal through one base station is also included in the mobile communications network. The request signal is for requesting a location registration process. The request signal is transmitted from a mobile communications terminal which has received the radio-zone information notification signal from the one base station.

The mobile communications network further includes a location registration means for performing a location registration process. The location registration process may generate information related to a present location of the mobile communications terminal in the radio zone of the one base station. The information may be generated based on the request signal received by the one base station.

The present invention provides still another mobile communications network for performing a location registration process to generate present location information of a mobile communications terminal. The mobile communication network comprises: a radio transmission device for transmitting a predetermined radio signal. The radio transmission device is sited in each radio zone of one or multiple specific base stations. Each of the one or multiple specific base stations constitute a radio zone corresponding to a part of a location registration area consisting of a plurality of radio zones.

The mobile communication network also includes a signal reception means for receiving a request signal through one base station. The request signal is for requesting a location registration process. The request signal is being transmitted from a mobile communications terminal that has received the transmitted radio signal. The mobile communication network further includes location registration means for performing a location registration process. The location registration process includes generating information on a present location of the mobile communications terminal in the radio zone of the one base station based on the request signal received by the one base station.

The present invention further provides a mobile communications terminal served by a mobile communications network. The mobile communication terminal comprises a memory for storing identification information of the mobile communications terminal itself. In addition, the mobile communication terminal includes signal reception means for receiving a radio-zone information notification signal. The radio-zone information notification signal is indicative of a radio zone of one or one of multiple specific base stations. The radio-zone information notification signal is being transmitted from each of the one or multiple specific base stations. Each of the one or multiple specific base stations constitutes a radio zone. Each of the one or multiple specific base stations may be part of a location registration area consisting of a plurality of radio zones. Each radio zone may be provided from a radio signal transmission device sited in each radio zone.

The mobile communication terminal further includes signal transmission means for transmitting a request signal to the one base station. The request signal is for requesting a location registration process. The location registration process includes performing location registration by generating present location information in the radio zone in response to the reception of the radio-zone information notification signal. The present location information is generated after including the stored identification information in the request signal.

According to the present invention, the ID of a base station covering a radio zone that includes a specific area where a mobile communications terminal is located is obtained. Thus, it is possible to know the detailed location of the mobile communications terminal, so that the user of the mobile communications terminal can be provided with specific information according to the location of the mobile communications terminal.

Other systems, methods, features and advantages of the invention will be or will become apparent to one with skill in the art upon examination of the following figures and detailed description. It is intended that all such additional systems, methods, features and advantages be included within this description, be within the scope of the invention, and be protected by the accompanying claims.

BRIEF DESCRIPTION OF THE DRAWINGS

FIG. 8 is an example data format of a location-related information database.

FIG. 15 is a process sequence chart illustrating an information distribution operation to distribute information to a mobile station that is illustrated in FIG. 12.

DETAILED DESCRIPTION OF THE PREFERRED EMBODIMENTS

The present invention may be carried out by the following embodiments depending on the modes of information distribution from an information distribution server to a mobile communications terminal.

One embodiment of the present invention may be applied to a first distribution mode. In the first distribution mode, an information distribution server may independently distribute information to a mobile communications terminal. The information may be distributed by the information distribution server without waiting for a request from the mobile communications terminal. This distribution mode is hereinafter called "push type distribution."

Push type distribution is used when, for example, an information distribution server wants to inform the user of every mobile communications terminal located near a first location, such as a train station referred to as an "A" station. The information distribution server may provide information about an event taking place near the "A" station. The information distribution server provides mobile communications terminals with information based on location information of the mobile communications terminals. The location information may be acquired by local location registration. Local location registration is performed in a narrower area than the conventional location registration area.

Another embodiment of the present invention may be applied to a second distribution mode. The second distribution mode involves a request to an information distribution server by a mobile communications terminal. In response to the request, information is distributed to the mobile communication terminal by the information distribution server. This distribution mode is hereinafter called "pull type distribution."

Pull type distribution is used when, for example, the user of a mobile communications terminal wants to go to a nearest location such as a bank. The user may make a request to an information distribution server about the positions of banks located around a current position of the mobile communications terminal. With pull type distribution, the location of a mobile communications terminal is determined based on identification of a base station (hereinafter called a base station ID). The base station may operate within a mobile communications network. The base station ID may be affixed to an information request signal transmitted to an information distribution server from the mobile communications terminal. In response, the mobile communication terminal is provided with information according to the location.

Each of the first and second distribution modes will be described with reference to the drawings. Note however that the present invention is not limited to the first and second distribution modes but can be modified in various ways within the scope of the technical concept.

A: First Distribution Mode

A-1: Configuration

A-1-1: General Configuration of a Mobile Communications System

Figure 1:
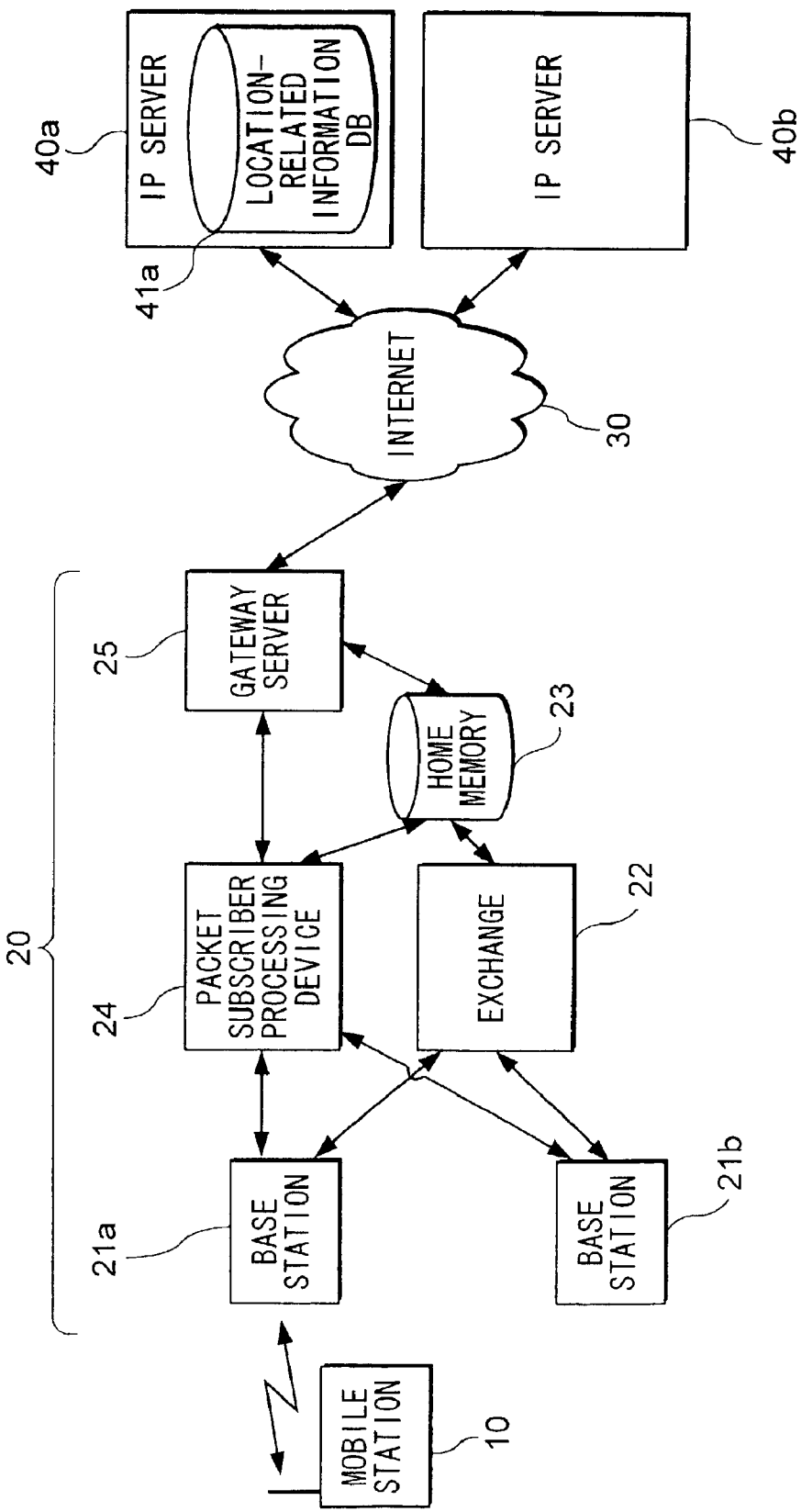
FIG. 1 is a block diagram showing an example configuration of a mobile communications system.

FIG. 1 is a block diagram showing the general configuration of an example mobile communications system. In the diagram, the mobile communications system comprises a mobile station 10 and a mobile packet communications network 20. The mobile packet communications network 20 may be a mobile communications network that serves the mobile station 10, an Internet 30 and a plurality of IP (Information Provider) servers 40 illustrated as first and second IP servers 40a and 40b. The IP servers 40a and 40b are server systems operated by one or more information providers. The IP servers 40a and 40b may be connected to a gateway server 25 via the Internet 30.

The mobile station 10 is a mobile communications terminal, such as a portable wireless telephone. The mobile station 10 may execute data communications via the mobile packet communications network 20. In addition, the mobile station 10 may execute voice communications via a mobile telephone network (not shown).

The mobile packet communications network 20 is a communications network for providing the mobile station 10 with a packet communications service. The mobile packet communications network 20 comprises a plurality of base stations 21 illustrated as a first and second base station 21a and 21b, an exchange 22, a home memory 23, a packet subscriber processing device 24 and the gateway server 25 that may be interconnected by communications lines as illustrated.

Multiple base stations 21a and 21b may be sited at predetermined geographic distances within a communications service area. Each of the base stations individually provide a radio zone generated by a radio transmission device sited in each of the base stations 21. The base stations 21 perform radio communications with the mobile station 10 present in each respective radio zone. The base stations 21a and 21b store base station IDs assigned to each of the base stations 21a and 21b. A base station ID is used for a distribution service for location related information as will be discussed later.

The exchange 22 serves a plurality of base stations that includes base stations 21a and 21b. The exchange 22 may perform a switching process of the communication line serving the mobile stations 10 present in the radio zones of the base stations 21a and 21b.

The home memory 23 is a storage device that may perform a location registration process and a location deletion process of the mobile station 10. The home memory 23 also operates as a location registration means and a location registration deleting means. In addition to the location registration information, various kinds of information such as subscriber information and billing information are stored in a database within the home memory 23.

The packet subscriber processing device 24 is a computer system configured to be included in the exchange 22. The exchange 22 stores unique identification information of the packet subscriber processing device 24. The unique identification information is a packet subscriber processing device identifier, hereinafter called "PID." The packet subscriber processing device 24 executes a process of relaying a packet exchange between the mobile station 10 and the gateway server 25.

The gateway server 25 is a computer system provided in a mobile packet gateway relaying/switching center (not shown) for connecting the mobile packet communications network 20 to other networks such as the Internet 30. In addition, the gateway server 25 converts between different communication protocols among a plurality of networks to relay data exchanged among the networks. For example, the gateway server 25 converts between a unique transmission protocol of the mobile packet communications network 20 and TCP/IP (Transmission Control Protocol/Internet Protocol) and relays packets exchanged between the mobile station 10 and the IP servers 40a and 40b. TCP/IP is one example of a communication protocol of the Internet 30.

Each of the IP servers 40a and 40b is an information distribution server providing the mobile station 10 with various kinds of information. In addition, the IP servers 40a and 40b may store information to be provided as data in a format such as an HTML (Hyper Text Markup Language) format (hereinafter called HTML data). Of those IP servers 40a and 40b illustrated, the first IP server 40a may be a server providing the mobile station 10 with information related to the location of the mobile station 10 (hereinafter called location related information). The first IP server 40a may include a location-related information database 41a for storing various types of location related information.

A-1-2: Location Registration

Local location registration may provide location related information relating to a limited area (hereinafter called "narrow-area location registration"). Local location registration is performed in addition to a conventional location registration (hereinafter called "wide-area location registration"). Conventional location registration is for paging the mobile station 10 at the time of incoming calls.

Figures 2, 3:
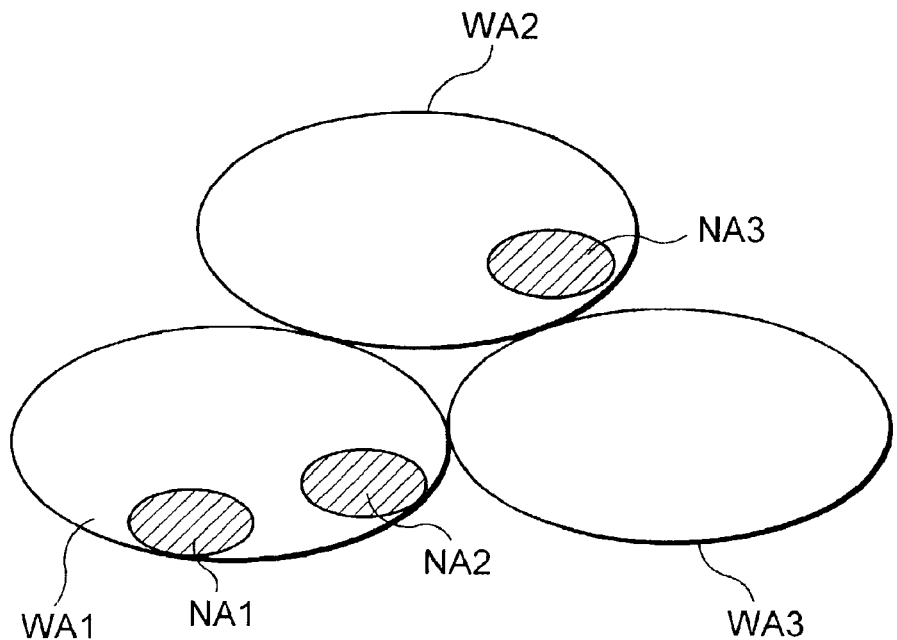
FIG. 2 is a diagram illustrating a relationship between a wide-area location registration area and a narrow-area location registration area.
FIG. 3 is an example format of a wide-area location registration database.

FIG. 2 is a conceptual diagram illustrating an example of the relationship between a wide-area location registration area for wide-area location registration and a narrow-area location registration area for narrow-area location registration. A plurality of wide-area location registration areas identified as WA1 to WA3 are areas defined by a plurality of radio zones covered by multiple base stations 21. A location registration process is carried out on an area-by-area basis. The base stations 21 may constantly broadcast area IDs of wide-area location registration areas to which the base stations 21 belong. The area IDs may be broadcast to mobile stations 10 present in the local radio zone of each of the base stations 21. Because the wide-area location registration process is a well-known technique, a detailed description of this technique is unnecessary. Information on wide-area location registration is registered in the home memory 23.

A narrow-area location registration area, on the other hand, is an area that is defined as a radio zone of single base station 21. As shown in FIG. 2, a narrow-area location registration area is not provided for all the radio zones of a plurality of base stations 21 that form the wide-area location registration areas WA1 to WA3. Instead, the narrow-area location registration area may be set for radio zones NA1, NA2 and NA3 of some base stations 21.

Thus, radio zones to which narrow-area location registration is applied may be selectively set for local areas (e.g., specific areas, such as the front of a train station and/or a busy shopping area). The number of radio zones available for narrow-area location registration may be considerably smaller than the total number of the radio zones formed by the base stations 21. Therefore, the execution of such narrow-area location registration in addition to wide-area location registration may not cause a problem such as an increase in communication traffic on the network.

Each of the base stations 21 of the radio zones NA1, NA2 and NA3 that are set as targets for narrow-area location registration may constantly broadcast an area ID of the wide-area location registration area to which the respective base station 21 belongs. In addition, the base station ID of a respective base station 21 may also be included with the area ID. The area ID may be broadcast to mobile communications terminals present in the radio zone of a respective base station 21. When the mobile station 10 is located in any of the narrow-area location registration areas NA1 to NA3, the mobile station 10 may detect a present location area.

The present location area may be detected by receiving the base station ID transmitted from the associated base station 21. In response, the mobile station 10 may transmit to the base station 21 a request signal for requesting narrow-area location registration. The request signal includes a mobile station ID. The mobile station ID includes identification information of the mobile station 10 that is stored in the mobile station 10. In addition, the mobile station ID includes the base station ID received by the mobile station 10. The request signal is transferred to the home memory 23 from the base station 21. Information relating to narrow-area location registration may be registered in the home memory 23 based on the request signal.

The narrow-area location registration is carried out when the area ID and/or the base station ID received by the mobile station 10 changes. The wide-area location registration is carried out when the area ID received by the mobile station 10 changes. When both the area ID and base station ID received by the mobile station 10 change as a result of the movement of the mobile station 10, a request signal requesting both wide-area location registration and narrow-area location registration may be transmitted to the base station 21 from the mobile station 10. Thus, the location of the mobile station 10 is registered in the home memory 23.

For example, a mobile station 10 that is located outside the wide-area location registration area WA1 and then moves into the narrow-area location registration area NA1 provided inside of the wide-area location registration area WA1. As such, both the narrow-area location registration (NA1) and the wide-area location registration (WA1) processes may be performed. In another example, a mobile station 10 that is already located in the wide-area location registration area WA1 has moved into the narrow-area location registration area NA1. In this example, movement is within the same wide-area location registration area. Thus, the area ID received by the mobile station 10 does not change and the narrow-area location registration does change. In this case, therefore, a wide-area location registration process is not executed but only a narrow-area location registration process is carried out.

A-1-3: Configuration of Home Memory 23

The home memory 23 includes a wide-area location registration database for storing the wide-area location registration information. In addition, the home memory 23 includes a narrow-area location registration database for storing the narrow-area location registration information.

FIG. 3 is an example format diagram showing the registered contents of the wide-area location registration database provided in the home memory 23. As illustrated in the diagram, the wide-area location registration database may store a mobile station ID in association with a wide-area location registration area ID. The association indicates that a mobile station 10 is located within a respective wide-area location registration area ID. The wide-area location registration area IDs may indicate the respective wide-area location registration areas WA1, WA2, WA3 (FIG. 3). For example, in FIG. 3, two mobile stations 10 indicated by mobile station IDs "MS09044444444" and "MS09055555555" are present in the wide-area location registration area that is indicated by an area ID "AREA0001."

When the mobile station 10 moves to a new wide-area location registration area, the wide-area location registration process is executed to renew the details registered in the wide-area location registration database.

Figures 4, 5:
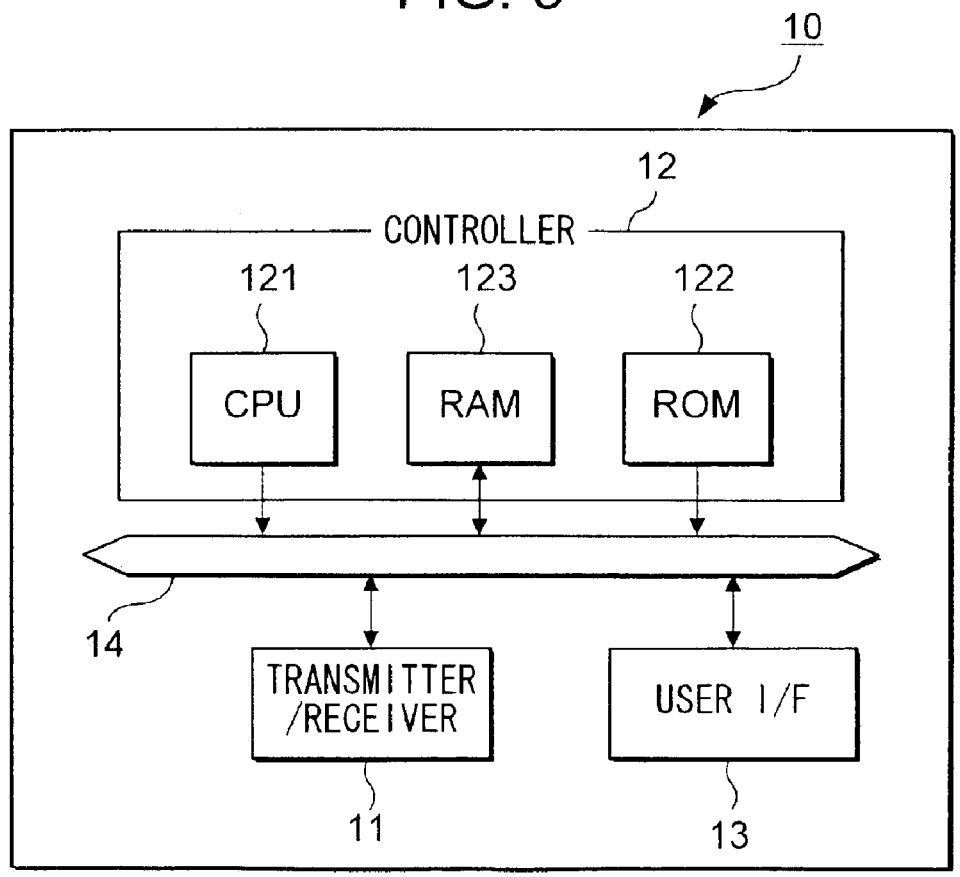
FIG. 4 is an example format of a narrow-area location registration database.
FIG. 5 is a block diagram showing a configuration of a mobile station.

FIG. 4 is an example format diagram showing the details present in an example of the narrow-area location registration database. As illustrated in the diagram, the narrow-area location registration database may store a mobile station ID in association with a base station ID. Thus indicating that a mobile station 10 is located in the radio zone of a base station 21 that is set to provide narrow-area location registration. For example, in FIG. 4, two mobile stations 10 identified by mobile station IDs "MS09011111111" and "MS09022222222" are present in the radio zone of the base station 21 identified by a base station ID "BS006." As further illustrated in FIG. 4, there is no mobile station 10 located in the radio zone of the base station 21 identified by a base station ID "BS0007."

When the mobile station 10 moves into a radio zone set to provide narrow-area location registration, the narrow-area location registration process may be executed. The narrow-area location registration process may be executed to renew the details registered in the narrow-area location registration database. The details of the narrow-area location registration process will be given later.

A-1-4: Configuration of Mobile Station 10

FIG. 5 is a block diagram showing an example configuration of the mobile station 10. In the diagram, the mobile station 10 comprises a transmitter/receiver 11, a controller 12 and a user interface (I/F) unit 13 all interconnected by a bus 14.

The transmitter/receiver 11 functions as signal transmission means and signal reception means and performs radio communications with the base stations 21 in the mobile packet communications network 20. The user interface unit 13 may include a display, such as liquid crystal display, which displays various kinds of information. In addition, the user interface unit 13 may include a user input device for a user to perform various kinds of input operations. The user input device may be for example, a keypad, a microphone, a speaker for the user to talk, etc. The controller 12 controls the mobile station 10. The controller 12 comprises a CPU (Central Processing Unit) 121, ROM (Read Only Memory) 122 and RAM (Random Access Memory) 123. In other examples, fewer or greater numbers of blocks may be used to illustrate the functionality of the controller 12.

The CPU 121 reads a control program stored as instructions in the ROM 122 and executes various kinds of control processes based on the instructions. The RAM 123 may be used as a work area for the CPU 121. Stored in the ROM 122 is a browser (not shown). The browser may interpret received data, such as HTML data, and provide an interactive function. Also stored in the ROM 122 is a control program for executing the narrow-area location registration process. The narrow-area location registration process is a precondition for providing a user with location related information. The mobile station ID of the mobile station 10 and a control program for providing the user with a voice communications service and packet communications service may also be stored as instructions in the ROM 122. 1A-1-5: Configuration of Gateway Server 25

Figures 6, 7:
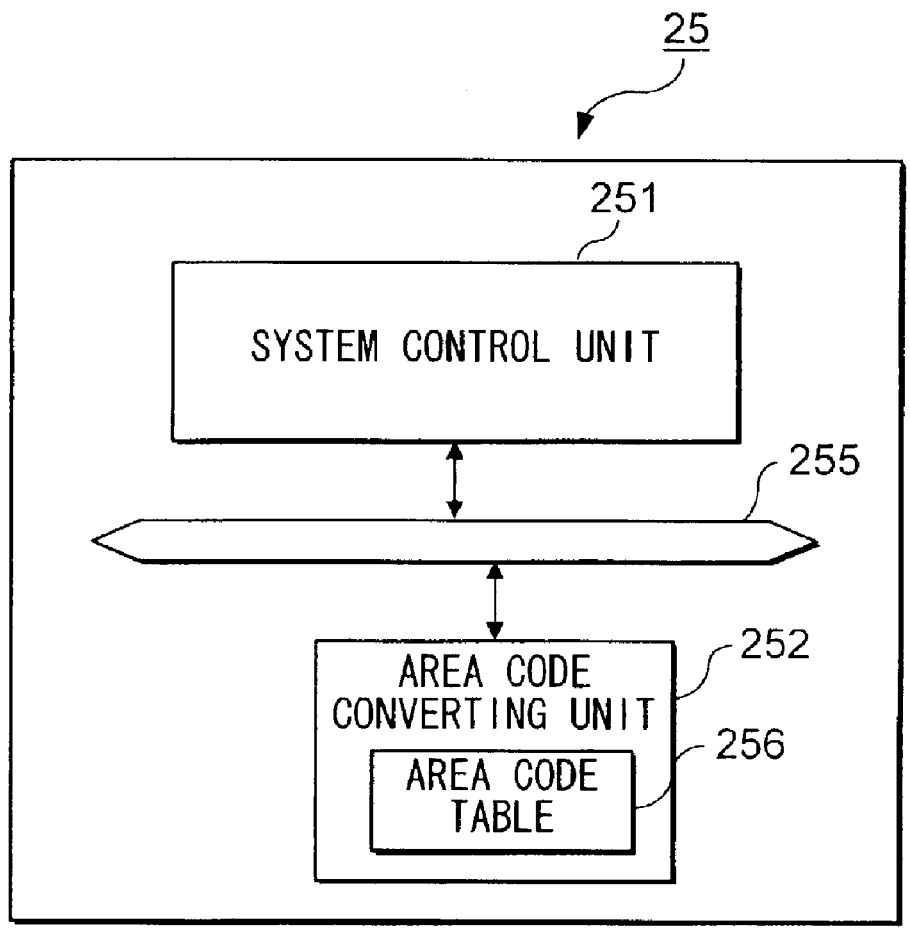
FIG. 6 is a block diagram showing a configuration of a gateway server.
FIG. 7 is an example format diagram of an area-code table provided in the gateway server of FIG. 6.

FIG. 6 is a block diagram showing the configuration of an example of the gateway server 25. In the diagram, the gateway server 25 comprises a system control unit 251 and an area code converting unit 252 interconnected by a bus 255. The system control unit 251 controls the gateway server 25. In addition, the system control unit 251 may function as an interface with networks, and, for example, execute a protocol conversion between the mobile packet communications network 20 and another network such as the Internet 30. The area code converting unit 252 converts between a "base station ID" and an "area code" by referring to an area code table 256. The "base station ID" may be identified as information indicating the location of the mobile station 10 in a mobile communications network. The "area code" may be identified by the IP servers 40a and 40b as information indicating the location of the mobile station 10 outside the mobile communications network.

FIG. 7 is a format diagram of an example of the area-code table 256 of FIG. 6. As shown in FIG. 7, a "base station ID" of the base station 21 that performs narrow-area location registration and an "area code" indicating an area where the base station 21 is sited are stored in the area code table 256. The base station ID and the area code are correlated with each other. For example, the radio zone of the base station 21 identified by the base station ID "BS006" is located in an area identified by an area code "CODE001".

A-1-5: Configuration of Location-related Information Database 41a

FIG. 8 is a format diagram of an example of the location-related information database 41a. As shown in the diagram, the "area code" of each area, the "area name" of the area identified by the area code and various types of "location related information" relating to that area are stored in the location-related information database 41a. For example, the area code "CODE001" indicates "1-chome, Yaesu, Chuo-ku, Tokyo (in front of Tokyo station)." Location related information such as "restaurant", "movie theater", "bank", "building name (or a site at which an event is held)" of an "event" or the like in that area, and "address" and "telephone number" may also be stored in association with the area code "CODE001."

A-2: Operation

In the first distribution mode (push type distribution) with the above-described configuration, the location of the mobile station 10 is obtained by performing narrow-area location registration based on a narrow-area location registration area. The mobile station 10 is provided with location related information based on the obtained location of the mobile station 10. Therefore, the following description will separately discuss 1) an operation associated with narrow-area location registration and 2) an operation for distributing location related information.

A-2-1: Operation Associated with Narrow-area Location Registration

The operation associated with narrow-area location registration may occur when the mobile station 10 moves into a narrow-area location registration area. Upon entry into the narrow-area location registration area, narrow-area location registration information may be registered using an area location registration process. In addition, when the mobile station 10 moves out of the narrow-area location registration area, the narrow-area location registration information already registered may be deleted. The individual operations will be discussed below.

(1) Registration Operation of Narrow-area Location Registration

A registration operation for narrow-area location registration information will be described by referring to an example sequence chart shown in FIG. 9 and the mobile communications system illustrated in FIGS. 1 and 2.

Figure 9:
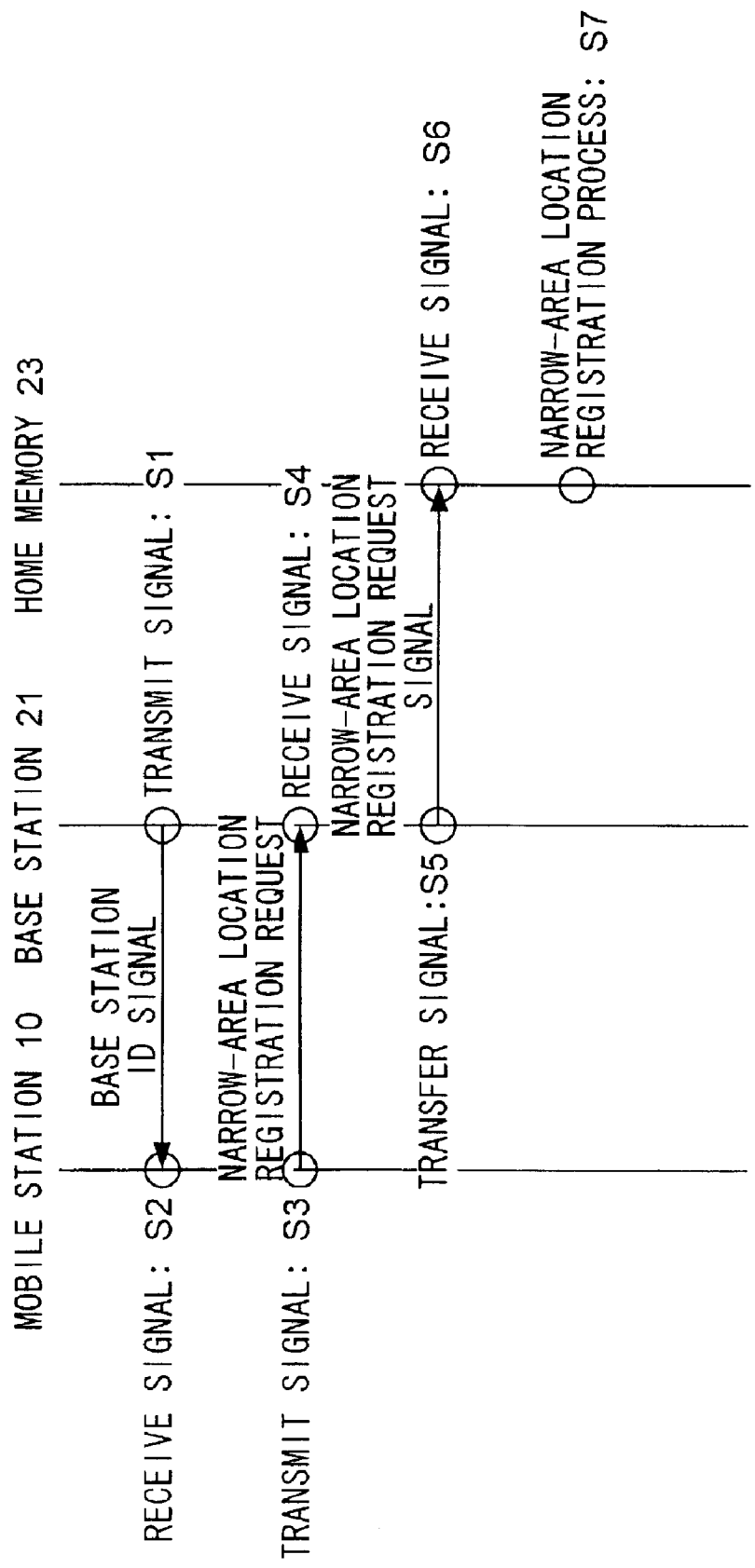
FIG. 9 is a process sequence chart illustrating a registration operation of narrow-area location registration.

The narrow-area location registration process illustrated in FIG. 9 is executed only for the mobile station 10 that has moved inside a narrow-area location registration area, such as one of the narrow-area location registration areas NA1 to NA3 (FIG. 2). For purposes of discussion, it is assumed that the narrow-area location registration process is performed for the mobile station 10 present in the narrow-area location registration area NA1.

A base station 21 sited in the narrow-area location registration area NA1 is constantly broadcasting within its own radio zone (i.e., the narrow-area location registration area NA1). The base station 21 may broadcast a base station ID signal indicating its own base station ID. In addition an area ID signal indicating the area ID of the wide-area location registration area (WA1) to which the base station 21 belongs may be included in the base station ID signal (step S1).

The mobile station 10 may transmit a narrow-area location registration request signal requesting narrow-area location registration upon reception of the base station ID signal. Specifically, when the mobile station 10 is located in the narrow-area location registration area NA1, the mobile station 10 receives the base station ID signal (step S2). Following receipt, the mobile station 10 transmits the narrow-area location registration request signal to the base station 21 (step S3). The narrow-area location registration request signal includes the base station ID indicated by the base station ID signal received by the mobile station 10 and the mobile station ID of the mobile station 10.

The base station 21 receives the narrow-area location registration request signal transmitted from the mobile station 10 (step S4). Next, the base station 21 transfers the received narrow-area location registration request signal to the home memory 23 (step S5). The home memory 23 receives the narrow-area location registration request signal transferred from the base station 21 (step S6). The home memory 23 detects the base station ID and mobile station ID included in the received narrow-area location registration request signal. The base station ID and mobile station ID may be registered in the narrow-area location registration database as narrow-area location registration information (step S7).

(2) Deletion Operation of Narrow-area Location Registration Information

Figure 10:
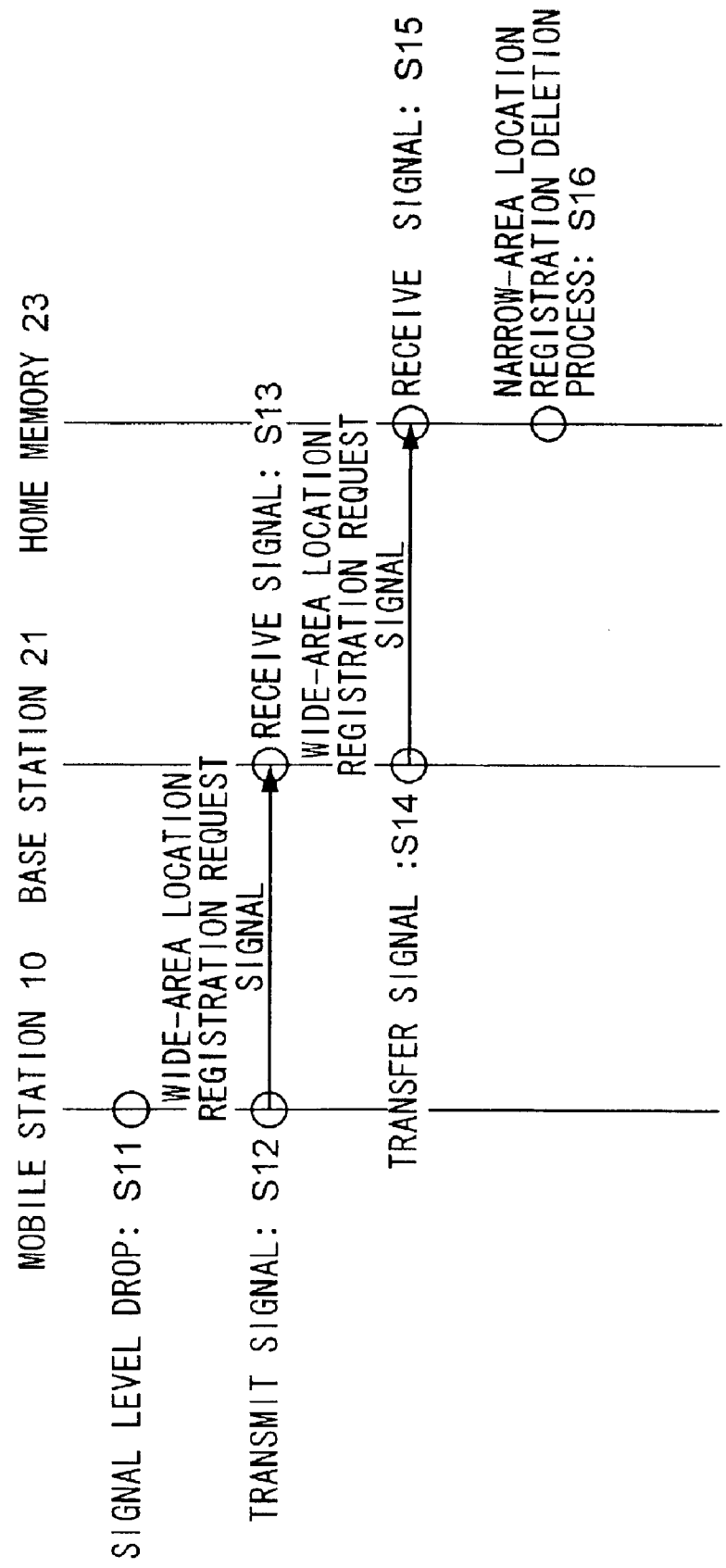
FIG. 10 is a process sequence chart illustrating a deleting operation of narrow-area location registration.

A deletion operation for narrow-area location registration information will be described by referring to an example sequence chart shown in FIG. 10 and the mobile communications system illustrated in FIG. 1. For purposes of discussion, it is assumed here that the mobile station 10 which was present in the narrow-area location registration area NA1 has moved out of the narrow-area location registration area NA1.

The mobile station 10 may transmit a narrow-area location registration deletion request signal when a determined condition occurs. For example, when the reception level of the base station ID signal becomes equal to or lower than a determined threshold value a narrow-area location registration deletion request signal may be transmitted. The narrow-area location registration deletion request signal may request the deletion of narrow-area location registration. When the mobile station 10 moves out of the narrow-area location registration area NA1, the reception level of the base station ID signal received by the mobile station 10 in the area NA1 becomes equal to or lower than a determined threshold value (step S11). Thus, the mobile station 10 transmits the narrow-area location registration deletion request signal to the base station 21 (step S12). The narrow-area location registration deletion request signal includes the mobile station ID of the mobile station 10 and the base station ID of the base station 21 with the deteriorated signal level.

The base station 21 receives the narrow-area location registration deletion request signal transmitted from the mobile station 10 (step S13). Next, the base station 21 transfers the received narrow-area location registration deletion request signal to the home memory 23 (step S14). The home memory 23 receives the narrow-area location registration deletion request signal transferred from the base station 21 (step S15). The home memory 23 then detects the base station ID and mobile station ID included in the received narrow-area location registration deletion request signal. The home memory 23 then deletes narrow-area location registration information comprising the detected base station ID and mobile station ID from the narrow-area location registration database (step S16).

A-2-2: Operation for Information Distribution with Push Type Distribution

Figure 11:
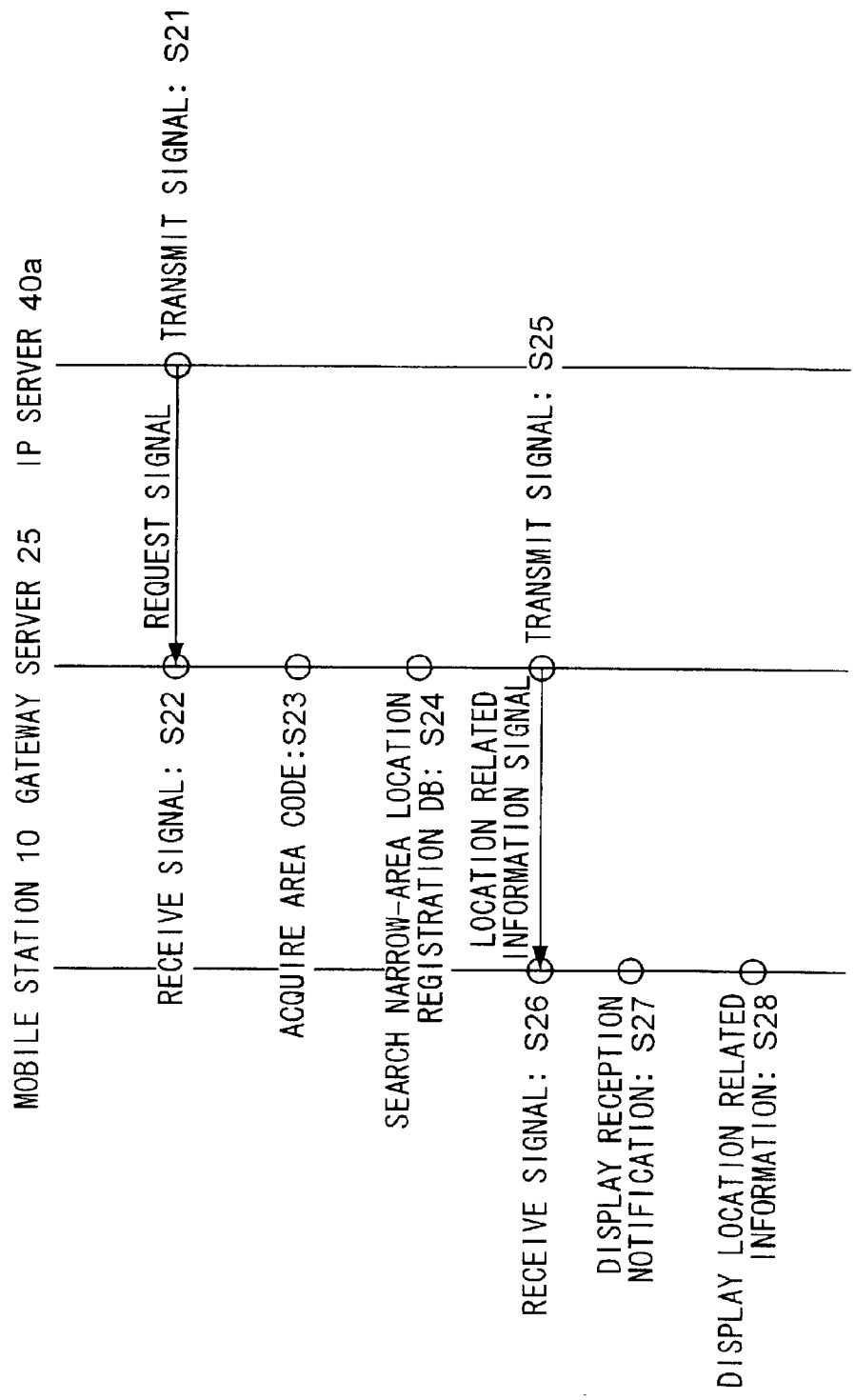
FIG. 11 is a process sequence chart illustrating an information distribution operation to distribute information to a mobile station.

An example operation to provide the mobile station 10 with location related information will be described by referring to a sequence chart shown in FIG. 11 and the mobile communications system illustrated in FIG. 1. For the purposes of discussion, it is assumed that the IP server 40a provides the user(s) of a mobile station(s) 10 located in front of a location such as Tokyo station with location related information relating to an event "D" which is held near Tokyo station.

First, the IP server 40a sends the gateway server 25 a request signal. The request signal may request that every mobile station 10 located in the area that includes the front of Tokyo station be provided with the location related information relating to the event "D" (step S21). The request signal includes an area code such as area code "CODE001" indicating the area that includes Tokyo station. In addition, the request signal includes the location related information relating to the event "D". The location related information relating to the event "D" may be acquired from the location-related information database 41a shown in FIG. 8. The request signal transmitted from the IP server 40a is received by the gategway server 25 (step S22). The gateway server 25 first detects the area code "CODE001" in the request signal. The gateway server 25 then searches the area code table 256 shown in FIG. 7 using the detected "CODE001" as a search key and acquires the associated base station ID "BS006" (step S23).

Next, the gateway server 25 accesses the home memory 23 and searches the narrow-area location registration database shown in FIG. 4 using the base station ID "BS006" acquired in step S23 as a search key. As a result of the search, the gateway server 25 acquires the mobile station IDs "MS09011111111" and "MS09022222222" of mobile stations that are present in the radio zone of the base station 21 identified by the base station ID "BS006" (step S24). The gateway server 25 then transmits an information signal indicating the location related information relating to the event "D" via the base station 21 identified by the base station ID "BS006" (step S25). The mobile stations 10 to which the information signal is to be sent are designated by the mobile station IDs "MS09011111111" and "MS09022222222" acquired in step S24.

Each of the mobile stations 10 identified by the mobile station IDs "MS09011111111" and "MS09022222222" may receive the information signal (step S26). The mobile stations 10 may then display on a display, such as a liquid crystal display, indication of receipt of the location related information to inform the user (step S27). The received location related information may be displayed in accordance with a predetermined key operation by the user who has seen the display, thereby providing the user with the location related information (step S28).

According to the above-described first distribution mode, location registration of the mobile station 10 is performed in a specific local area within a conventional location registration area. Location registration in a specific area is performed so that a more detailed location of the mobile station 10 can be obtained. The more detailed location of the mobile station 10 enables the provision of more detailed location related information to the user of the mobile station 10.

B: Second Distribution Mode

A description will now be given of the aforementioned pull type distribution mode.

B-1: Configuration

B-1-1: General Configuration of Mobile Communications System

Figure 12:
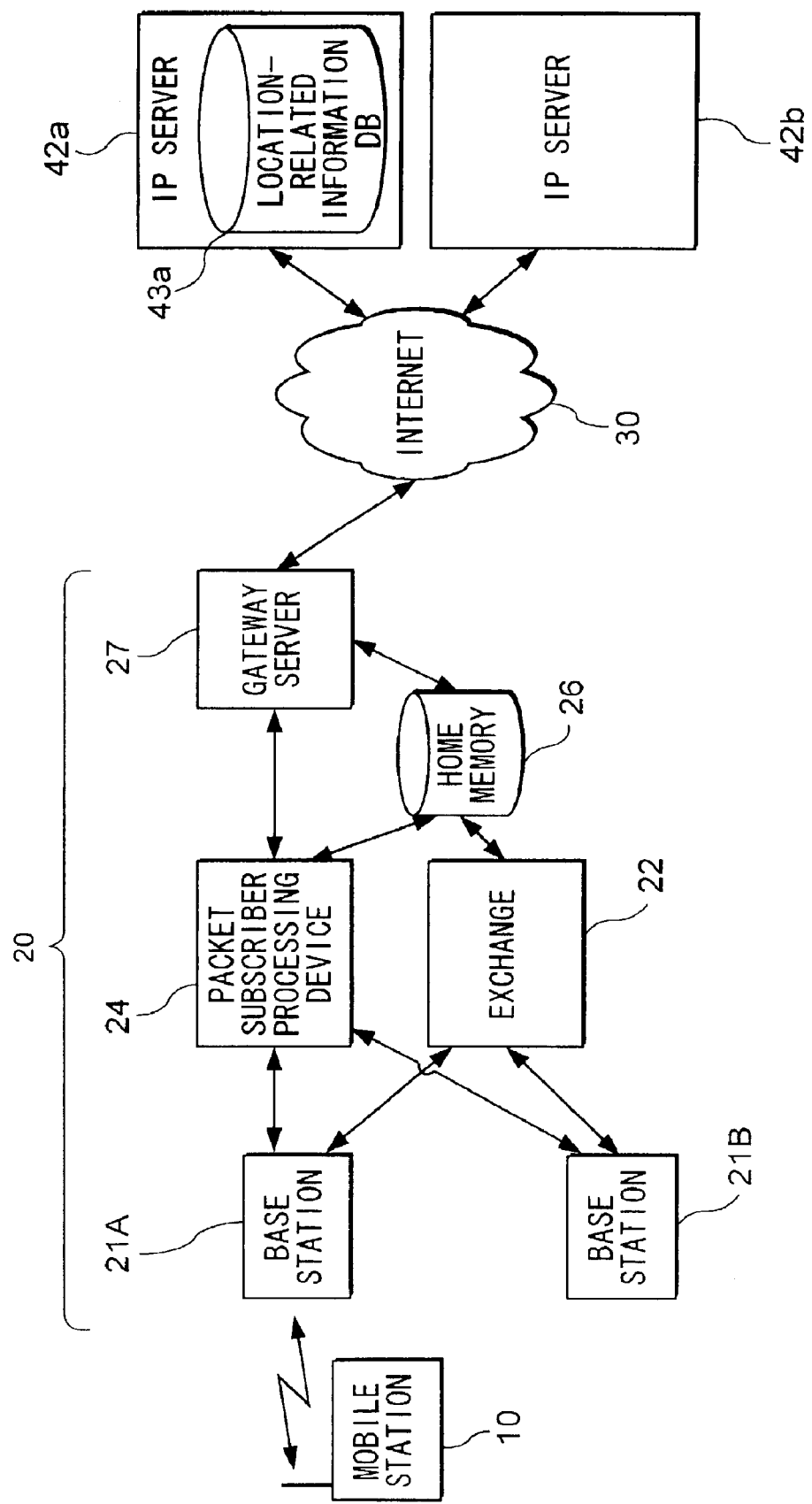
FIG. 12 is block diagram showing another example configuration of a mobile communications system.

FIG. 12 is a block diagram showing an example general configuration of the mobile communications system according to the second distribution mode. In FIG. 12, the same reference numerals are given to those components which are similar to the components illustrated in the mobile communication system of FIG. 1, so their description will not be repeated.

The functionality of the mobile communications system shown in FIG. 12 however, differs from the mobile communications system illustrated in FIG. 1 in the configuration of the base stations, 21A and 21B as discussed later. In addition, the mobile communications system shown in FIG. 12 includes a home memory 26, a gateway server 27 and an IP server 42a with functionality that differs from the functionality of the mobile communications system shown in FIG. 1.

As mentioned above, the second distribution mode is a "pull type distribution" in which information is distributed to a mobile communications terminal (mobile station 10) in response to a request. The request may be made by the mobile communications terminal to an information distribution server. Specifically, according to the second distribution mode, unlike the first distribution mode, the location of the mobile station 10 is not determined by using narrow-area location registration information.

Instead, when a request signal requesting location registration (previously described as wide-area location registration with regard to the first distribution mode) is transmitted from the mobile station 10, the base station ID of the base station 21 that has received the request signal is automatically affixed to the request signal and sent to the home memory 26. The home memory 26 determines the location of the mobile station 10 using the base station ID. Therefore, the base stations 21A and 21B execute a location registration process based on a conventional location registration area (i.e., a wide-area location registration area). The home memory 26 has a database for storing conventional location registration information similar to the first distribution mode. However, a database for storing narrow-area location registration information is unnecessary in the home memory 26 with the second distribution mode.

B-1-2: Configuration of Gateway Server 27

Figures 13, 14:
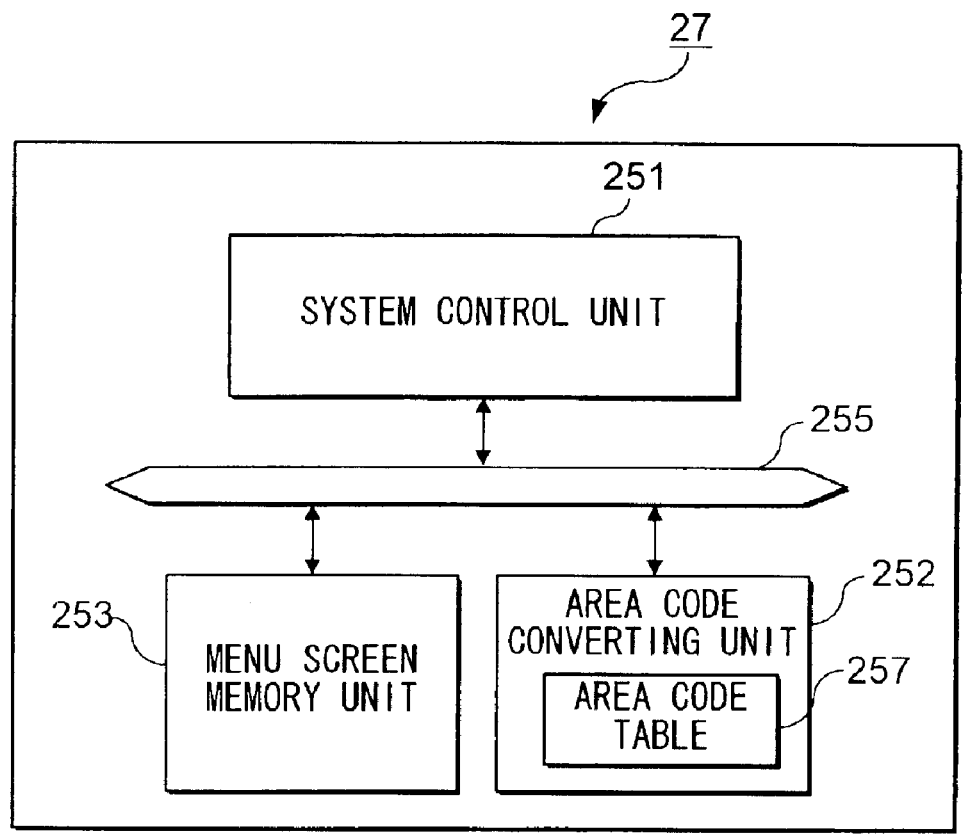
FIG. 13 is a block diagram showing a configuration of a gateway server as illustrated in FIG. 12.
FIG. 14 is an example format of an area-code table provided in the gateway server illustrated in FIG. 12.

FIG. 13 is a diagram showing an example configuration of the gateway server 27. In the diagram, the gateway server 27 comprises a menu screen memory unit 253, the system controller 251 and the area code converting unit 252 interconnected by the bus 255.

The menu screen memory unit 253 may store data, such as HTML data, that is to be displayed as an initial menu screen on the mobile station 10. The initial menu screen is a screen that may display initial menu items of various services available to the user of the mobile station 10. The menu screen memory unit 253 may send the data for the initial menu screen in response to a request from the mobile station 10.

The initial menu items may include, for example, an "electronic mail service" and a "news flash service." In addition, the initial menu items may also include a "location information distribution service." Embedded in each of those menu items is an address such as a URL (Uniform Resource Locator) which designates the information resource of one or more of the IP servers 42a and 42b capable of executing a corresponding service. That is, when the user of the mobile station 10 selects a desired item from the displayed initial menu items, it is possible to automatically gain access to the address of the corresponding information resource(s), so that the user can acquire information.

The area code converting unit 252 includes an area code table 257. The area code table 257 may be used to convert a "base station ID" to an "area code." FIG. 14 is an example format diagram of data to be stored in the area-code table 257. As shown in the diagram, the "base station IDs" of the base stations 21A and 21B are stored in association with "area codes." in the area code table 257. The "area codes" indicate areas where the base stations 21A and 21B are located.

Unlike the area code table 256 of the first distribution mode, the area code table 257 stores the "base station IDs"

of all the base stations 21A and 21B and their associated respective "area codes". For example, a base station 21 identified by a base station ID "BS0001" is located in an area identified by an area code "CODE012." In addition, base stations 21 identified by base station IDs "BS0001 to BS0005" are located in an area identified by an area code "CODE030".B-1-3: Configuration of IP server 42a The IP server 42a that provides location related information stores service menu screen data. The service menu screen data provides a user with more detailed service menus. In response to a request from the mobile station 10, the IP server 42a may send the service menu screen data to the mobile station 10 via the gateway server 27. The service menus may include, for example, a "restaurant information distribution service", "bank information distribution service", "movie theater information distribution service", etc. The service menus may provide a user with information such as location information of a nearest restaurant, bank, movie theater, etc. The address, such as a URL, of an information resource which provides each service menu may be embedded in the service menu in the IP server 42a. When the user selects a desired service menu on the service menu screen, the mobile station 10 may access the information resource that is designated by the address embedded in the service menu. B-1-4: Acquisition of the Location of Mobile Station 10

A description will now be given of how to acquire the location of the mobile station 10 by referring to FIG. 12. A service request signal may be transmitted to the IP servers 42a and 42b from the mobile station 10. When the service request signal is being relayed, each of the base stations 21A and 21B and the packet subscriber processing device 24 shown in FIG. 12 may add its own ID to the service request signal. That is, when the service request signal is received by the base station 21A, the base station ID of the base station 21A is added. When the service request signal is received by the packet subscriber processing device 24, the PID of the packet subscriber processing device 24 is added.

The service request signal transmitted from the mobile station 10 and addressed to the IP server 42a may pass through the mobile packet communications network 20, and is received by the gateway server 27. The service request signal may include the mobile station ID of the mobile station 10. In addition, the service request signal may include the base station ID and the PID that were added during the process of being relayed through the network. By referring to the mobile station ID and the base station ID in the service request signal transmitted from the mobile station 10, the gateway server 27 can learn which mobile station 10 is located in the radio zone of which base station 21. B-2: Operation Next, the operation of the second distribution mode with the above-described configuration will be discussed by referring to an example sequence chart illustrated in FIG. 15 and the example mobile communications system shown in FIG. 12.

First, the mobile station 10 may call the gateway server 27 in accordance with a predetermined key operation by a user. The mobile station 10 also transmits a packet communications start request signal requesting the initiation of a packet communications service (step S31). The packet communications start request signal from the mobile station 10 is received by the gateway server 27 (step S32). The gateway server 27 goes into a packet exchange mode and transmits initial menu screen data stored in the gateway server 27 to the mobile station 10 (step S33). The mobile station 10 receives initial menu screen data (step S34). The menu screen data is interpreted to display an initial menu screen on the display of the mobile station 10. The mobile station 10 then waits for a user to make a menu selection input (step S35).

The user may select a desired service menu, such as the "location information distribution service" provided by the IP server 42a from the initial menu screen. The mobile station 10 transmits an IP server access request signal requesting access to the IP server 42a based on the selected service menu. The IP server access request signal includes the address, such as a URL, embedded in the selected service menu of the initial menu and the mobile station ID of the mobile station 10 (step S36). The IP server 42a then receives through the gateway server 27 the IP server access request signal sent from the mobile station 10 (step S37). The gateway server 27 may then transmit service menu screen data from the IP server 42a to the mobile station 10. A destination mobile station is designated by the mobile station ID included in the IP server access request signal (step S38).

The mobile station 10 receives the service menu screen data via the gateway server 27 (step S39). The mobile station 10 then interprets the received data to display a service menu screen on the display and waits for the user to make a menu selection input (step S40).

When the user selects a desired service menu item, the mobile station 10 transmits a service request signal requesting the provision of the selected service. The service request signal includes the address embedded in the selected service menu item and the mobile station ID of the mobile station 10 (step S41). For example, the user may be located in front of Tokyo station and has selected the "bank information distribution service" to acquire information about nearby banks. The gateway server 27 receives the service request signal sent from the mobile station 10 (step S42). The gateway server 27 searches the area code table 257 (shown in FIG. 14) using the base station ID ("BS0006") affixed to the service request signal as a search key. As a result of the search, the gateway server 27 acquires a corresponding area code "CODE001." The gateway server 27 converts the base station ID "BS0006" affixed to the service request signal into the associated area code "CODE001" (step S43).

The gateway server 27 next sends the service request signal to the information resource of the IP server 42a designated by the address in the service request signal (step S44). The IP server 42a receives the service request signal sent from the gateway server 27 (step S45). By referring to the area code "CODE001" included in the service request signal, the IP server 42a acquires location related information of an area corresponding to the area code (i.e., information about banks in front of Tokyo station) from the location-related information database 41a shown in FIG. 8 (step S46). The IP server 42a then transmits the acquired location related information to the gateway server 27 with the mobile station 10 designated based on the mobile station ID included in the service request signal (step S47). The mobile station 10 receives the location related information for display via the gateway server 27 (step S48). Thus, the user achieves the desired purpose.

The second distribution mode described above has the following advantages. The service request signal transmitted to the IP server 42a from the mobile station 10 includes the base station ID of the base station 21 which indicates the radio zone in which the mobile station 10 is presently communicating. Therefore the specific area in which the mobile station 10 is located can be acquired by using the base station ID. As a result, the user of the mobile station 10 can be provided with location related information relating to a more limited area.

C: Modifications

As already mentioned the present invention is not limited to the described embodiments but can be modified in various forms such as those given below.

C-1: Mode of Area for Narrow-area Location

A narrow-area location registration area may be an area which has a radio zone covered by a single base station. The embodiments however are not so limited. Alternatively, an area having radio zones covered by plural (e.g., two or more) base stations may be a single narrow-area location registration area. In this case, the base stations broadcast the base station ID assigned to the narrow-area location registration area within their respective radio zones.

C-2: Mode of Registration Operation for Narrow-area Location Registration

According to the above-described first distribution mode, the mobile station 10 detects its presence in a narrow-area location registration area by receiving the base station ID sent from the base station 21. However, the embodiments should not necessarily be limited to the first distribution mode and may also operate in the modes discussed below.

(1) For example, the mobile station 10 may detect that it is present in a narrow-area location registration area by receiving a radio signal sent from a given radio device. Specifically, a radio-signal transmission device which transmits a radio signal, such as infrared rays, may be sited in a narrow-area location registration area. The radio signal transmitted from the radio-signal device is a signal for instructing the transmission of a narrow-area location registration request signal to the mobile station 10.

The mobile station 10 may be capable of receiving the radio signal transmitted from the signal transmission device. In addition, the mobile station 10 may be designed to transmit a narrow-area location registration request signal including its own mobile station ID to the base station 21 upon reception of the radio signal.

When receiving a call signal from the mobile station 10, the base station 21 may detect the mobile station ID in the call signal. The base station 21 may send the detected mobile station ID and its own base station ID to the home memory 23. The home memory 23 may store the received mobile station ID and base station ID in a narrow-area location registration database 232.

(2) Further, narrow-area location registration may be carried out by using a call signal transmitted from the mobile station 10. Specifically, when a user uses the mobile station 10 to make a phone call to another mobile station or a fixed telephone, the mobile station ID and a narrow-area location registration request may be included in the call signal transmitted from the mobile station 10. When the base station 21 that performs narrow-area location registration receives such a call signal, the base station 21 may detect the mobile station ID in the received call signal. The base station 21 may transmit the detected mobile station ID and its own base station ID to the home memory 23. The home memory 23 may store the received mobile station ID and base station ID in the narrow-area location registration database 232.

C-3: Mode of Deletion Operation for Narrow-area Location Registration

According to the above-described first distribution mode, the operation of deleting narrow-area location registration may be executed when the reception level of the signal from the base station ID drops, but it is not limited to such operation. For example, narrow-area location registration information associated with the mobile station 10 in the narrow-area location registration database may be deleted when the mobile station 10 completes the reception of location related information transmitted from the IP server 40a. Specifically, when the mobile station 10 completes the reception of location related information, the mobile station 10 may send a reception completion signal to the base station 21. The reception completion signal includes the mobile station ID of the mobile station 10. Upon receipt of the reception completion signal, the base station 21 may transfer the reception completion signal to the home memory 23. The home memory 23 may delete the narrow-area location registration information in the narrow-area location registration database 232 by referring to the mobile station ID in the received reception completion signal.

C-4: Mode of Mobile Station 10

While the first and second distribution modes use a mobile communications terminal such as a portable telephone, it is not so limited. Alternatively, a mobile communications terminal such as PDA (Personal Digital Assistants) or PHS (Personal Handyphone System) exclusively for data communications may be used if they have functionality for radio-communicating data with the base station 21 in the mobile packet communications network 20.

C-5: Mode of IP Servers 40a, 40b, 42a and 42b

While the IP servers 40a, 40b, 42a and 42b in FIGS. 1 and 12 are connected to the gateway server 25 via the Internet 30 in the illustrated embodiments, it should not necessarily be limited to such a connection. For example, the IP servers 40a, 40b, 42a and 40b may be connected to the gateway server 25 via special lines or may be provided inside the mobile packet communications network 20.

C-6: Description Language for Data

While data supplied to the mobile station 10 from the gateway server 25 and the IP servers 40a, 40b, 42a and 42b is described as in HTML format, it is not so limited. Other description languages, such as XML (Extensible Markup Language), may also be used.

While various embodiments of the invention have been described, it will be apparent to those of ordinary skill in the art that many more embodiments and implementations are possible that are within the scope of this invention. According, the invention is not to be restricted except in light of the attached claims and their equivalents.

What is claimed is:

1. A gateway server communicating with a plurality of mobile terminal via a first network and communicating with a plurality of information provider servers via a second network, comprising:

a menu data control that sends a mobile terminal via the first network at least one set of menu data to guide a user of the mobile terminal, through at least one round of menu selection process, to a selection requesting location-related information that the user is interested in obtaining, wherein at least one of the at least one set of menu data is accessible by the gateway server;

a request transmission control that receives a request for the location-related information from the mobile terminal via the first network and sends the request via the second network to an information provider server;

an area code finder that uses at least one communication area identifier, recognized for communication with the mobile terminal within the first network, to obtain an area code, and informs the information provider server of the area code via the second network, wherein the information provider server uses the area code to obtain the location-related information regarding a geographical area definable by the information provider server in relation to the area code; and an information transmission control that receives from the information provider server via the second network at least a part of the location-related information regarding the geographical area and sends at least a part of the received information to the mobile terminal via the first network.

2. A gateway server according to claim 1, wherein there is more than one set of menu data, and a selection from one set of menu data leads to a next set of menu data.

3. A gateway server according to claim 1, wherein the area code finder informs the information provider server of the area code when the request transmission control sends the request to the information provider server.

4. A gateway server according to claim 1, wherein the area code finder obtains the area code before the request transmission control sends the request to the information provider server.

5. A gateway server according to claim 1, wherein the request from the mobile terminal comprises a network address attributed to the information provider server.

6. A gateway server according to claim 1, wherein the communication area identifier is indicative of a point of attachment to the first network by the mobile terminal.

7. A gateway server according to claim 1, wherein the communication area identifier is recognized for communication with the mobile terminal situated in the geographical area.

8. A gateway server according to claim 1, wherein the mobile terminal is a wireless mobile terminal.

9. A gateway server according to claim 8, wherein the communication area identifier is indicative of a base station that provides a wireless connection to the mobile terminal.

10. A gateway server according to claim 8, wherein the communication area identifier is indicative of the location of a base station that provides a wireless connection to the mobile terminal.

11. A gateway server according to claim 8, wherein the communication area identifier is indicative of an paging area in which the mobile terminal may be found.

12. A gateway server according to claim 1, wherein the area code relates to the geographical area definable to variable scale.

13. A gateway server according to claim 1, wherein the area code is devised independently of a postal code system.

14. A gateway server according to claim 1, wherein the area code identifies the geographical area by a street number and name.

15. A gateway server according to claim 1, wherein the area code identifies the geographical area by a landmark object.

16. A gateway server according to claim 1, wherein the geographical area is defined generally by at least one radio zone including a radio zone created by a base station that provides a wireless connection to the mobile terminal.

17. A gateway server according to claim 1, wherein the location-related information regarding the geographical area comprises location information of at least one location where a service of interest is available in the geographical area.

18. A gateway server according to claim 1, wherein the location-related information regarding the geographical area comprises location information of at least one location where an event of interest is held in the geographical area.

19. A gateway server according to claim 1, wherein the area code finder determines the area code by accessing a table that correlates communication area identifiers to their corresponding area codes.

20. A gateway server according to claim 1, wherein the geographical area id defined by the information provider server in relation to the area code.

21. A method for providing a mobile terminal with location-related information through a gateway server that communicates with a plurality of mobile terminals via a first network and communicates with a plurality of information provider servers via a second network, comprising the steps of:

sending a mobile terminal via the first network at least one set of menu data to guide a user of the mobile terminal, through at least one round of menu selection process, to a selection requesting the location-related information that the user is interested in obtaining, wherein at least one of the at least one set of menu data is accessible by the gateway server;

receiving a request for the location-related information from the mobile terminal via the first network;

sending the request via the second network to an information provider server;

obtaining an area code by using at least one communication area identifier, recognized for communication with the mobile terminal within the first network;

informing the information provider server of the area code via the second network, wherein the information provider server uses the area code to obtain the location-related information regarding a geographical area definable by the information provider server in relation to the area code;

receiving from the information provider server via the second network at least a part of the located-related information regarding the geographical area; and sending at least a part of the received information to the mobile terminal via the first network.

22. A method according to claim 21, wherein there is more than one set of menu data, and a selection from one set of menu data leads to a next set of menu data.

23. A method according to claim 21, wherein sending the request to the information provider server and informing the information provider server of the area code are performed concurrently.

24. A method according to claim 21, wherein obtaining an area code is performed prior to sending the request to the information provider server.

25. A method according to claim 21, wherein the request from the mobile terminal comprises a network address attributed to the information provider server.

26. A method according to claim 21, wherein the communication area identifier is indicative of a point of attachment to the first network by the mobile terminal.

27. A method according to claim 21, wherein the communication area identifier is recognized for communication with the mobile terminal situated in the geographical area.

28. A method according to claim 21, wherein the mobile terminal is a wireless mobile terminal.

29. A method according to claim 28, wherein the communication area identifier is indicative of a base station that provides a wireless connection to the mobile terminal.

30. A method according to claim 28, wherein the communication area identifier is indicative of the location of a base station that provides a wireless connection to the mobile terminal.

31. A method according to claim 28, wherein the communication area identifier is indicative of an paging area in which the mobile terminal may be found.

32. A method according to claim 28, wherein the geographical area is defined generally by at least one radio zone including a radio zone created by a base station that provides a wireless connection to the mobile terminal.

33. A method according to claim 21, wherein the area code relates to the geographical area definable to variable scale.

34. A method according to claim 21, wherein the area code is devised independently of a postal code system.

35. A method according to claim 21, wherein the area code identifies the geographical area by a street number and name.

36. A method according to claim 21, wherein the area code identifies the geographical area by a landmark object.

37. A method according to claim 21, wherein the location-related information regarding the geographical area comprises location information of at least one location where a service of interest is available in the geographical area.

38. A method according to claim 21, wherein the location-related information regarding the geographical area comprises location information of at least one location where an event of interest is held in the geographical area.

39. A method according to claim 21, wherein obtaining an area code comprises accessing a table that correlates communication area identifiers to their corresponding area codes.

40. A method according to claim 21, wherein the geographical area is defined by the information provider server in relation to the area code.

* * * * *

UNITED STATES PATENT AND TRADEMARK OFFICE
CERTIFICATE OF CORRECTION

PATENT NO. : 6,947,754 B2
APPLICATION NO. : 10/111733
DATED : September 20, 2005
INVENTOR(S) : Koichi Ogasawara Page 1 of 1

It is certified that error appears in the above-identified patent and that said Letters Patent is hereby corrected as shown below:

On the Title Page

In column 1, item (75), delete "Chigasaki" and substitute --Kanagawa-- in its place.

Page 2, column 2, line 7, under "OTHER PUBLICATIONS", immediately before "Location Services" insert --"-- (opening quotations).

Page 2, column 2, line 8, under "OTHER PUBLICATIONS", immediately after "stage 1" insert --"-- (closing quotations).

In the Claims

Column 19, in claim 11, line 2, after "identifier is indicative of" delete "an" and substitute --a-- in its place.

Column 20, in claim 20, line 2, after "geographical area" delete "id" and substitute --is-- in its place.

Column 20, in claim 31, line 2, after "identifier is indicative of" delete "an" and substitute --a-- in its place.

Signed and Sealed this

First Day of May, 2007

JON W. DUDAS
*Director of the United States Patent and Trademark Office*